E. JOHNSON.
LUBRICATING DEVICE.
APPLICATION FILED NOV. 10, 1913. RENEWED OCT. 4, 1915.
1,224,647.  Patented May 1, 1917.
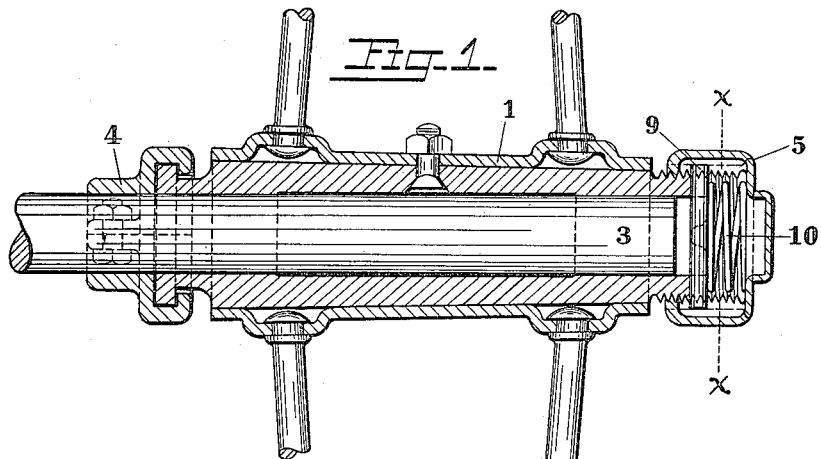
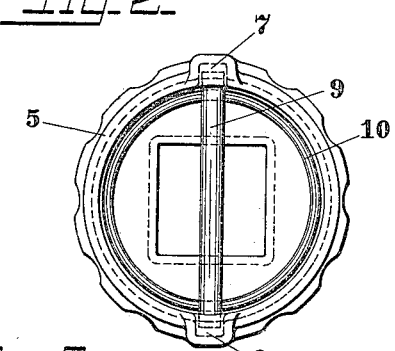
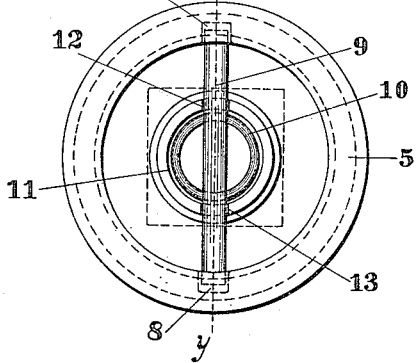
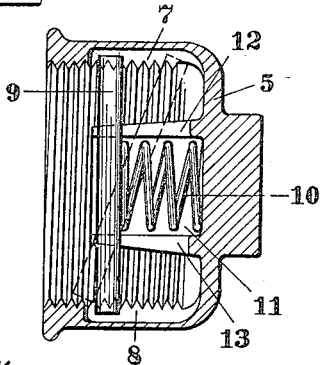
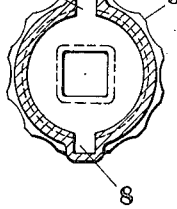
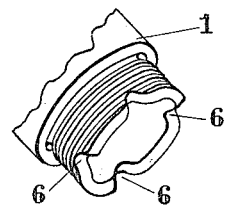

UNITED STATES PATENT OFFICE.

ERIC JOHNSON, OF MOLINE, ILLINOIS, ASSIGNOR TO DEERE & COMPANY, OF MOLINE, ILLINOIS, A CORPORATION OF ILLINOIS.

LUBRICATING DEVICE.

1,224,647.

Specification of Letters Patent.

Patented May 1, 1917.

Application filed November 10, 1913, Serial No. 800,139. Renewed October 4, 1915. Serial No. 54,090.

*To all whom it may concern:*

Be it known that I, ERIC JOHNSON, a citizen of the United States, residing at Moline, in the county of Rock Island and State of Illinois, have invented certain new and useful Improvements in Lubricating Devices, of which the following is a specification, reference being had therein to the accompanying drawing.

My invention relates to devices employed for feeding a lubricant to shafts or axles, and more particularly to the axles of agricultural machinery.

The objects of my invention will be more clearly described and claimed in the following specification.

Referring to the drawings in which similar numerals indicate identical parts—

Figure 1 is a longitudinal section of a wheel hub illustrating the application of my invention. Fig. 2 is an enlarged end view of my device. Fig. 3 is a section on the line *x—x* of Fig. 1. Fig. 4 is a detail. Fig. 5 is an end view of a modification of my invention, and Fig. 6 is a section on the line *y—y* of Fig. 5.

In the drawings 1 is the hub of a wheel having its outer end threaded. An axle 3 is journaled in the hub 1 and is retained therein by a member 4 secured to the axle and adapted to be clasped about a flange on the inner end thereof, a well known form of construction.

My invention is applied to the outer end of the hub 1 and comprises a cap 5 having a turned in edge which is threaded to engage with the threaded end of the hub 1. In the inner circumference of the cap 5, and opposite each other, are grooves or recesses 7 and 8 within which are movably retained the ends of a member 9; between the end of the cap 5 and the member 9 is a spring 10, preferably a coil, by the pressure of which the member 9 is held in engagement with notches 6 on the outer end of the hub 1. The cap 5 is filled with the lubricant and placed in position on the end of the hub 1, the threaded edge of the cap 5 and the threaded end of the hub 1 engaging so that the cap 5 can be adjusted farther upon the hub 1 or removed therefrom at will. When the cap 5 is in place on the end of the hub 1 the member 9 engages with opposite notches 6 and is held in position by the pressure of the spring 10, which is sufficiently strong to prevent accidental dislodgment of the member 9 but which will readily yield to any force required to turn the cap 5, so that the member 9 will be moved from one pair of notches to another as the cap is turned, the edges of the notches 6 being beveled or rounded to facilitate the movement of the member 9. As the cap 5 is turned in one direction it advances on the hub 1, compressing the lubricant held in the cap and forcing it around the axle 3 the revolution of which softens the lubricant and causes it to spread more freely.

In Figs. 5 and 6 the spring 10 is held in a tubular recess or socket 11, preferably forming part of the cap 5, and having oppositely disposed slots 12 and 13 in which the member 9 is movably held, the operation of the member 9 with the notches 6 however being similar in both forms. To facilitate the turning of the cap 5 on the hub 1 the outer circumferential surface of the cap 5 may be corrugated. In illustrating my invention I have shown the member 9 having both of its ends engaging the notches 6. I do not confine myself to this construction as the member 9 will be equally effective in holding the cap 5 from turning if the member 9 engages with only one of the notches 6. In providing a series of notches varying degrees of adjustment of the cap 5 are possible, that is it can be turned one or more notches according to the quantity of lubricant it is desired to be extruded. One notch only can be provided however, so that the member 9 will engage therewith when the cap 5 is given a half turn.

My device is simple and inexpensive, and very effective in operation.

What I claim is—

1. In a device of the character described, the combination with a hub, of a cap on the hub adapted to be turned one way to approach the end of the hub and to recede therefrom when turned in the opposite direction, and a member carried by the cap and adapted to engage with a notch on the hub to hold the cap from turning.

2. In a device of the character described, the combination with a hub, of a cap on the end of the hub adapted to be turned one way to approach the end of the hub and to recede therefrom when turned in the opposite direction, a member carried by the cap and engaging with a notch in the end of the hub and adapted to be disengaged therefrom, and means to retain said member in engagement with a notch when the cap is at rest.

3. In a device of the character described, the combination with a hub having one or more notches in the end thereof, of a cap on the end of the hub and adapted to be turned one way to approach the end of the hub and to recede therefrom when turned in the opposite direction, a member within said cap engaging with a notch in the end of the hub and adapted to be disengaged therefrom by the turning of the cap, and resilient means within the cap operating to retain the member in engagement with a notch when the cap is at rest.

4. In a device of the character described, the combination with a hub having a series of notches in the end thereof, of a cap on the end of the hub and adapted to be turned one way to approach the end of the hub and to recede therefrom when turned in the opposite direction, a member within said cap engaging with a notch in the end of the hub and adapted to be disengaged therefrom by the turning of the cap, and resilient means between the end of the cap and the member to retain the latter in engagement with a notch when the cap is at rest.

5. In a device of the character described, the combination with a hub having a series of oppositely disposed notches in the end thereof, a cap on the end of said hub and turnable one way to approach the end of the hub and to recede therefrom when turned in the opposite direction, a member within said cap engaging with a notch in the end of the hub and adapted to be disengaged from said notch by the turning of the cap, and a spring in the cap between the end thereof and the member to retain the latter in engagement with the notch when the cap is at rest.

6. In a device of the character described, the combination with a hub having a series of notches in the end thereof, of a cap on the end of the hub and adapted to be turned one way to approach the end of the hub and to recede therefrom when turned in the opposite direction, a member within said cap engaging with the notches in the end of the hub and adapted to be disengaged therefrom by the turning of the cap, and resilient means between the end of the cap and the member to retain the latter in engagement with the notches when the cap is at rest.

7. In a device of the character described, the combination with a hub having a series of oppositely disposed notches in the end thereof, a cap on the end of said hub and turnable one way to approach the end of the hub and to recede therefrom when turned in the opposite direction, a member within said cap engaging with notches in the end of the hub and adapted to be disengaged from said notches by the turning of the cap, and a spring in the cap between the end thereof and the member to retain the latter in engagement with the notches when the cap is at rest.

8. In a device of the character described, the combination with a hub having its outer end threaded, a series of diametrically disposed notches in the end of the hub, a cap threaded interiorly to engage with the threaded end of the hub and turnable one way to approach the hub and to recede therefrom when turned in the opposite direction, a member within the cap engaging with two oppositely disposed notches on the end of the hub and adapted to be disengaged therefrom by the turning of the cap, and a coiled spring within the cap between the end thereof and the member to retain the latter in engagement with the notches when the cap is at rest.

9. In a device of the character described, the combination with a hub having its outer end threaded, of a cap having its rim turned inward and threaded to engage with the threaded end of the hub and turnable to approach or recede therefrom, a series of diametrically opposed notches in the threaded end of the hub, opposite longitudinal grooves in the inner surface of the cap, a member within the cap having its ends movably held in said grooves, said member engaging with the notches in the hub and disengaged therefrom by the turning of the cap, and a coil spring interposed between the member and the end of the cap to retain the member in engagement with the notches when the cap is at rest.

10. In a device of the character described, the combination with a hub having its outer end threaded, of an interiorly threaded cap adapted to engage with the threaded end of the hub and turnable thereon to approach or recede therefrom, a member within said cap having its ends movably confined in oppositely disposed longitudinal grooves in the inner surface of the cap and engaging with opposite notches in the threaded end of the hub and disengaged from said notches by the turning movement of the cap, and a coil spring interposed between the member and the end of the cap to retain the member in engagement with the notches when the cap is at rest.

In testimony whereof I affix my signature in presence of two witnesses.

ERIC JOHNSON.

Witnesses:
Jessie L. Simser,
W. G. Duffield.

Copies of this patent may be obtained for five cents each, by addressing the "Commissioner of Patents, Washington, D. C."